United States Patent [19]

Lecerf et al.

[11] 4,292,382

[45] Sep. 29, 1981

[54] POSITIVE ACTIVE MATERIAL FOR AN ELECTRIC CELL, A METHOD OF PREPARING THE POSITIVE ACTIVE MATERIAL AND A CELL WHICH USES IT

[75] Inventors: André Lecerf, Pace; Michel Broussely, Poitiers, both of France

[73] Assignee: Saft Leclanche, Poitiers, France

[21] Appl. No.: 157,893

[22] Filed: Jun. 9, 1980

[30] Foreign Application Priority Data

Jun. 27, 1979 [FR] France ............................ 79 16554

[51] Int. Cl.³ ............................................. H01M 4/58
[52] U.S. Cl. ..................................... 429/197; 429/220
[58] Field of Search ........................ 429/220, 197, 194

[56] References Cited

PUBLICATIONS

Pascal, Nouveau Traite De Chimie Minerale, vol. III, p. 343, Masson et Cie., Paris, 1957.

Pascal, Nouveau Traite De Chimie Minerale, vol. VI, p. 196, Masson et Cie., Paris, 1961.

Weir et al., Infrared Spectra of the Crystalline Inorganic Borates, A. Physics and Chemistry, vol. 68 A, No. 5, Sep.–Oct., 1964, pp. 465–467 and 485.

Ripoll et al., The Crystal Structure of Copper Metaborate $CuB_2O_4$, Acta. Cryst., 1971, B27, 677.

L. Lecuir et J. Guillerment, C.R. Acad. Sc. Paris t. 273, Dec. 20, 1971, Serie B.

*Primary Examiner*—Donald L. Walton
*Attorney, Agent, or Firm*—Kenyon & Kenyon

[57] ABSTRACT

A positive active material for an electric cell, said material being constituted by anhydrous copper borate whose formula is $Cu_3B_2O_6$. A method of making such an active material. An electric cell whose positive active material (3) is anhydrous copper borate $Cu_3B_2O_6$, whose negative active material (6) is lithium and whose electrolyte is a solution which is liquid at ambient temperature and whose solvent is an aprotic compound.

5 Claims, 4 Drawing Figures

POSITIVE ACTIVE MATERIAL FOR AN ELECTRIC CELL, A METHOD OF PREPARING THE POSITIVE ACTIVE MATERIAL AND A CELL WHICH USES IT

The invention relates to a positive active material for an electric cell, a method of preparing the positive active material and a cell which uses it.

Known compounds of the oxygenated boron salt type are referred to in Pascal's treatise, on p. 196 of vol. VI, of the 1961 edition (published by Masson et Cie) as "tiers-borates" and have formulas of $B_2O_3, 3M_2O$; $M_2O$ is a basic alkaline oxide in which $M_2$ can be replaced by a bivalent element X.

Again in Pascal's treatise, on p. 343 of vol. III of the 1957 edition it is mentioned that Rose is reported to have obtained a hydrated orthoborate whose formula is $Cu_3(BO_3)_2, 3H_2O$ by the wet method in 1852.

The invention provides a positive active material for electric cells, characterized in that it is constituted by an anhydrous borate whose formula is $Cu_3B_2O_6$.

More particularly, said material is suitable for electric cells with a negative lithium electrode and non-aqueous electrolyte. Electrolyte solvents may be either esters such as propylene carbonate or ethylene carbonate, or cyclic ethers such as tetrahydrofuran and dioxolane or straight chain ethers such as dimethyl ethers (glymes), and, in particular, dimethoxyethane, or mixtures thereof. The solute is preferably lithium perchlorate but can also be lithium tetrafluoroborate or lithium hexafluoroarsenate, not to mention others.

The invention also provides a method of preparing anhydrous copper borate $Cu_3B_2O_6$. Copper borate is prepared by making boric oxide $B_2O_3$ react with copper oxide CuO:

$$B_2O_3 + 3CuO \rightarrow Cu_3B_2O_6$$

The oxides are mixed in a ratio of one mole of $B_2O_3$ to three moles of CuO and the mixture is heated to a temperature which lies between about 800° C. and 1000° C.

At a temperature lower than 800° C., no $Cu_3B_2O_6$ is formed and some residual copper oxide remains. At a temperature higher than 1000° C., melting and partial decomposition take place.

Preferably, the heating temperature lies between 900° C. and 950° C. Indeed, between 800° C. and 900° C., the reaction takes place only slowly and above 950° C. the compound must not be heated for too long, otherwise it eventually begins to decompose.

In contrast, between 900° C. and 950° C., the reaction is rapid and the material is stable.

In accordance with a preferred preparation method, the mixture is heated for one hour at 900° C., the preparation is homogenized by crushing, then the mixture is again heated for one hour at 900° C. X-ray examination of the crystals obtained shows that the lattice is triclinic and that the values of the parameters are:

$a = 18.44$ Å  $\alpha = 90°$
$b = 3.378$ Å  $\beta = 96.50°$
$c = 18.41$ Å  $\gamma = 90°$ The density calculated from these parameters: $\rho = 4.493$ g/cm³ is in good agreement with the measured density: $\rho = 4.50$ g/cm³.

The invention will be better understood from the following examples described with reference to the accompanying drawings in which.

Figure 1:
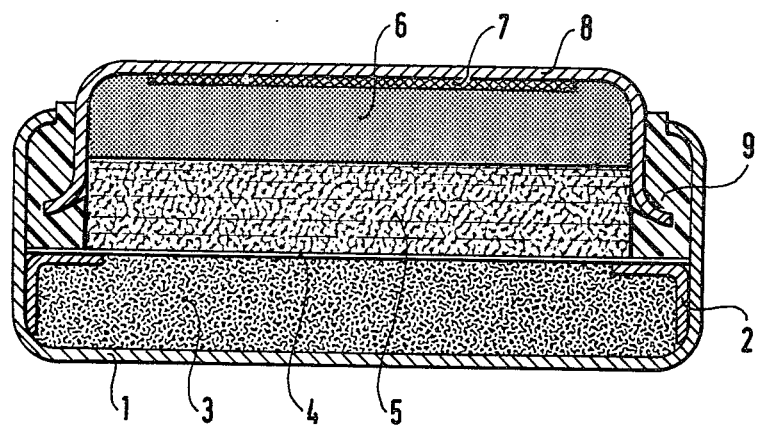
FIG. 1 illustrates schematically a cell in accordance with the invention made for the tests described in the examples.

Cells in accordance with the invention have been made in the form of button type cells as schematically illustrated in FIG. 1.

In FIG. 1, reference 1 designates a stainless steel positive cup which contains a positive active mass 3 held by a metal ring 2. A negative cap 8, also made of stainless steel, contains the negative active material 6 which is lithium pressed onto a nickel support grating 7 welded to the cap 8.

The active materials are separated by a polyethylene separation barrier 4 and a porous cellulose separator 5 impregnated with electrolyte.

A polypropylene seal 9 insulates the cup from the cap and provides sealing for the cell.

The positive active material in accordance with the invention, namely anhydrous copper borate $Cu_3B_2O_6$, is mixed with 5% by weight of graphite to form a positive active mass. All the cells in the following examples use 280 mg of said positive active mass. This corresponds to a theoretical capacity of 138 mAh. The exchange area of the electrodes is about 0.60 cm². The quantity of lithium corresponds to a theoretical capacity of 195 mAh which is very much greater than that of the positive electrode.

Figure 2:
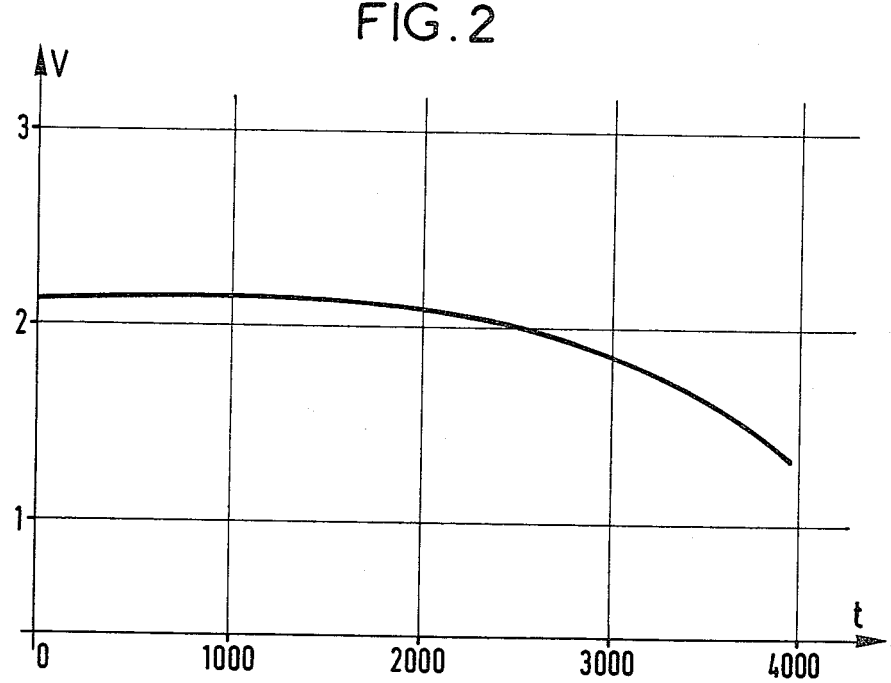
FIG. 2 illustrates the discharge curve of a cell in accordance with the invention at a fairly low discharge rate.

1st example: Cells such as just described were assembled with an electrolyte comprising a molar solution of lithium perchlorate in propylene carbonate. They were discharged through a resistance of 62 kΩ. The average discharge curve is shown in FIG. 2 where the discharge time t in hours is plotted along the X-axis and the voltage V in volts is plotted along the Y-axis.

As shown, the voltage is slightly higher than 2 volts during the first part of the discharge. Discharge was stopped at 1.3 volts and gave 126 mAh, i.e. an efficiency of 90%.

Figure 3:
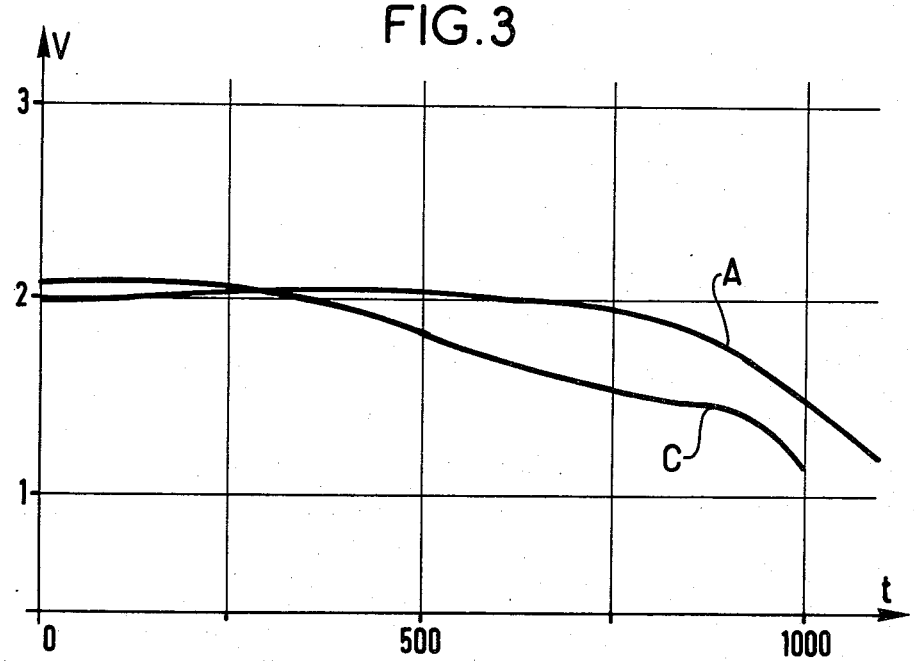
FIG. 3 illustrates the discharge curves of two other cells in accordance with the invention at a medium discharge rate.

2nd example: Analogous cells were assembled with an electrolyte comprising a molar solution of lithium perchlorate in a mixture containing equal volumes of propylene carbonate and of 1,2-dimethoxyethane. The cells were discharged through a resistance of 15 kΩ. Their average discharge curve is shown at A in FIG. 3 which is analogous to FIG. 2. Discharge was stopped at 1.2 volts and gave 138 mAh, i.e. an efficiency of 100%. The voltage stayed at about 2 volts during most of the discharge.

Figure 4:
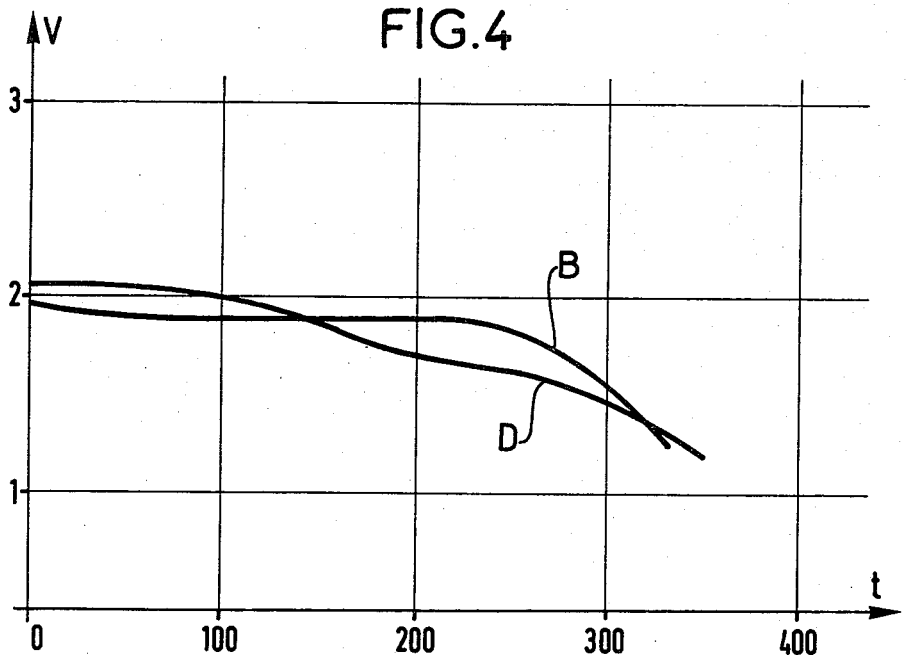
FIG. 4 illustrates the discharge curves of two similar cells to those in FIG. 3 at a high discharge rate.

3rd example: Cells similar to those in example 2 were discharged through a resistance of 5 kΩ, i.e. at a fairly high rate. The average discharge curve is shown at B in FIG. 4 which is analogous to FIG. 3. The voltage stayed at about 1.9 volts during most of the discharge. Discharge was stopped at 1.2 volts and the capacity obtained was 120 mAh, i.e. an efficiency of 87%. The average current density was 0.59 mA/cm² and, during most of the discharge, it was 0.64 mA/cm².

4th example: Cells analogous to those in the preceding examples but in which the electrolyte was a 2M solution of lithium perchlorate in dioxolane were used and discharged through a resistance of 15 kΩ. The average discharge is shown by curve C in FIG. 3. The end voltage was taken at 1.2 volts and the capacity obtained was 120 mAh, i.e. an efficiency of 87%.

Although the initial voltage is higher than 2 volts, it drops below this voltage more rapidly than in cells in the 2nd example. In actual fact, it seems that the discharge curve has two steps.

5th example: Cells similar to those in the 4th example were discharged through a resistance of 5 kΩ. Their discharge is illustrated by curve D in FIG. 4. If the discharge is stopped at 1.2 volts, a capacity of 124 mAh i.e. an efficiency of 90% is obtained. The shape of the discharge curve is analogous to that of curve C. The average current density was 0.59 mA/cm$^2$.

Of course, the cells in the preceding examples are test cells and the design thereof may be improved, in particular by reducing the very great surplus of lithium to increase the quantity of positive mass. It is thus possible to produce cells of the same size with a capacity of 150 mAh which corresponds, for example in the case of cells in accordance with the 2nd example, to an energy of about 300 mWh.

Numerous applications can be found for such cells, e.g. in pace-makers. Of course, the positive active material can also be used in cells of different shapes, e.g. in cylindrical cells. As seen in the 3rd and 5th examples, the active material is able to discharge at fairly high rates and is therefore suitable for this type of cell.

We claim:

1. An electric cell having a positive electrode which comprises a positive active material, said material consisting of an anhydrous copper borate whose formula is $Cu_3B_2O_6$.

2. An electric cell which includes a positive active material comprising anhydrous copper borate $Cu_3B_2O_6$, a negative electrode comprising lithium and an electrolyte comprising a solution which is liquid at ambient temperature and whose solvent is an aprotic compound.

3. An electric cell according to claim 2, wherein the solvent is chosen from the group consisting of esters, cyclic ethers and ethers with straight chains and mixtures thereof.

4. An electric cell according to claim 3, wherein the esters are propylene carbonate and ethylene carbonate, the cyclic ethers are tetrahydrofuran and dioxolane and the ethers with straight chains are 1-2-dimethyoxyethane and other dimethyl ethers.

5. An electric cell according to any one of claims 2 to 4, wherein the solute of the electrolyte is chosen from the group consisting of lithium perchlorate, lithium tetrafluoroborate and lithium hexafluoroarsenate.

* * * * *